United States Patent
Gowdru et al.

(10) Patent No.: US 8,024,801 B2
(45) Date of Patent: Sep. 20, 2011

(54) NETWORKED COMPUTER SYSTEM WITH REDUCED VULNERABILITY TO DIRECTED ATTACKS

(75) Inventors: Savitha Somashekharappa Gowdru, Bangalore (IN); Atul Kisanrao Hedaoo, Karnataka (IN); Santhosh Narasimhan, Karnataka (IN); Mahantesh Patrimath, Karnataka (IN); Ravi Kumar Singh, Kundanhalli (IN)

(73) Assignee: Agere Systems Inc., Allentown, PA (US)

( * ) Notice: Subject to any disclaimer, the term of this patent is extended or adjusted under 35 U.S.C. 154(b) by 1051 days.

(21) Appl. No.: 11/842,972

(22) Filed: Aug. 22, 2007

(65) Prior Publication Data

US 2009/0055927 A1 Feb. 26, 2009

(51) Int. Cl.
*G06F 7/04* (2006.01)
(52) U.S. Cl. .............................. 726/22; 726/26; 709/223
(58) Field of Classification Search ...................... 726/22
See application file for complete search history.

(56) References Cited

U.S. PATENT DOCUMENTS

| | | | |
|---|---|---|---|
| 5,369,704 A * | 11/1994 | Bennett et al. | 715/205 |
| 5,892,903 A | 4/1999 | Klaus | |
| 6,148,407 A | 11/2000 | Aucsmith | |
| 6,205,551 B1 * | 3/2001 | Grosse | 726/25 |
| 7,152,105 B2 | 12/2006 | McClure et al. | |
| 7,152,244 B2 * | 12/2006 | Toomey | 726/26 |
| 7,574,741 B2 * | 8/2009 | Aviani et al. | 726/23 |
| 7,761,918 B2 * | 7/2010 | Gula et al. | 726/23 |
| 2003/0065945 A1 * | 4/2003 | Lingafelt et al. | 713/201 |
| 2004/0015728 A1 * | 1/2004 | Cole et al. | 713/201 |
| 2004/0128552 A1 * | 7/2004 | Toomey | 713/201 |
| 2005/0262557 A1 * | 11/2005 | Fellenstein et al. | 726/22 |
| 2006/0048224 A1 * | 3/2006 | Duncan et al. | 726/22 |
| 2007/0277238 A1 * | 11/2007 | Margalit et al. | 726/22 |
| 2008/0141346 A1 * | 6/2008 | Kay et al. | 726/4 |

\* cited by examiner

*Primary Examiner* — Ponnoreay Pich
(74) *Attorney, Agent, or Firm* — Ryan, Mason & Lewis, LLP

(57) ABSTRACT

An attacker is prevented from obtaining information about the configuration of a computer system. Each of one or more revealing content elements that may be found in outgoing data transmitted by the computer system and that are capable of being used by the attacker to obtain the information about the configuration of the computer system is associated with one or more respective replacement content elements. Outgoing data to be transmitted by the computer system are then scanned for these one or more revealing content elements. A revealing content element found in the outgoing data is replaced by a replacement content element from the one or more replacement content elements associated with that revealing content element. This is done before the outgoing data is transmitted.

20 Claims, 3 Drawing Sheets

| REVEALING CONTENT ELEMENTS | REPLACEMENT CONTENT ELEMENTS |
|---|---|
| | |
| HTTP BANNER INCLUDES: OPERATING SYSTEM/VERSION | "MAC OS X/10.0" |
| | "MICROSOFT-IIS/5.0" |
| | "SOLARIS/10.0" |
| | |
| TELNET BANNER INCLUDES: OPERATING SYSTEM/VERSION | "MAC OS X/10.0" |
| | "MICROSOFT-IIS/5.0" |
| | "SOLARIS/10.0" |
| | |
| TCP/IP PROTOCOL HEADER FIELDS INCLUDE: SEQUENCE NUMBER WHEN RECEIVED FIN PACKET SENT TO CLOSED PORT | RECEIVED SEQUENCE NUMBER +0 |
| | RECEIVED SEQUENCE NUMBER +1 |
| | |
| UDP/ICMP PROTOCOL HEADER FIELDS INCLUDE: TYPE OF SERVICE WHEN RECEIVED UDP PACKET SENT TO UNUSED PORT | "0" |
| | "0xC0" |

| REVEALING CONTENT ELEMENTS | REPLACEMENT CONTENT ELEMENTS |
|---|---|
| HTTP BANNER INCLUDES: <u>OPERATING SYSTEM/VERSION</u> | "MAC OS X/10.0" |
| | "MICROSOFT-IIS/5.0" |
| | "SOLARIS/10.0" |
| TELNET BANNER INCLUDES: <u>OPERATING SYSTEM/VERSION</u> | "MAC OS X/10.0" |
| | "MICROSOFT-IIS/5.0" |
| | "SOLARIS/10.0" |
| TCP/IP PROTOCOL HEADER FIELDS INCLUDE: <u>SEQUENCE NUMBER</u> WHEN RECEIVED FIN PACKET SENT TO CLOSED PORT | RECEIVED SEQUENCE NUMBER +0 |
| | RECEIVED SEQUENCE NUMBER +1 |
| UDP/ICMP PROTOCOL HEADER FIELDS INCLUDE: <u>TYPE OF SERVICE</u> WHEN RECEIVED UDP PACKET SENT TO UNUSED PORT | "0" |
| | "0xC0" |

NETWORKED COMPUTER SYSTEM WITH REDUCED VULNERABILITY TO DIRECTED ATTACKS

FIELD OF THE INVENTION

The present invention relates generally directed to computer systems, and more particularly, to networked computer systems and directed attacks on networked computer systems.

BACKGROUND OF THE INVENTION

Corporate computer systems often store confidential internal and customer information. As a result, they are frequently targeted for attacks by directed attackers (also called "hackers" or "crackers") who wish to use the confidential information for unlawful purposes. In fact, for many businesses, the increasing threat of the exposure of confidential information in networked computer systems represents the largest area of concern for financial loss, especially when customer credit card or banking details may be exposed. Total losses in 2005 due to the theft of confidential information from computer systems are estimated to be $30 million.

A directed attacker attempts to penetrate a specific target computer system by discovering and exploiting weaknesses that make the particular computer system vulnerable. One technique for doing this is called network fingerprinting. A packet of data transmitted from a networked computer system typically contains information in a set of protocol header fields corresponding to its particular protocol stack (e.g., Transmission Control Protocol (TCP) and Internet Protocol (IP)). Unfortunately, the content of many of these protocol header fields may reveal configuration information about the sending computer system. Using network fingerprinting techniques, a directed attacker may analyze the revealing content elements in the protocol header fields in order to determine a computer system's operating system, software applications, equipment manufacturers, protocol header vendors, and other detailed system information. For example, a computer system's operating system (e.g., Microsoft Windows®, Linux®, Mac OS®, etc.) can usually be accurately determined by examining the content of fewer than nine different TCP/IP protocol header fields. Once determined, the attacker leverages any detected vulnerabilities in order penetrate the targeted computer system's security features. After gaining access to the target computer system, the attacker then steals and/or destroys information, depending on the attacker's motives. The attacker may also install "backdoors" such as Trojans or rootkits to bypass security patches or improved security mechanisms that may be implemented in the future. Such backdoors are typically very hard to detect and to eliminate.

A popular network fingerprinting tool is Nmap, presently available without cost as open-source software from Insecure.org. Nmap tests a target computer system by sending a series of TCP and User Datagram Protocol (UDP) data packets to the target computer system and examining the responses that it receives. After performing dozens of such tests, Nmap compares the results to its database of more than 1,500 known operating system fingerprints and displays the operating system details if there is a match.

In addition to, or as an alternative to the above-described network fingerprinting, a directed attacker may attempt to discover configuration information about a target computer system by simply trying to access a target system through its available communication applications. These communication applications will often implement communication protocols such as the Teletype Network Protocol (TELNET), the File Transfer Protocol (FTP), and the Simple Mail Transfer Protocol (SMTP). Frequently, these communication applications display a banner (or response header) on their login and exit screens, as well and on other screens (e.g., screens indicating that the maximum number of connections has been reached). As in the case of protocol header fields, the content of these banners may reveal operating system and version information in addition to other information that can be exploited by a determined directed attacker. This additional or alternative discovery technique is sometime called "banner grabbing."

There are, of course, several existing techniques for securing networked computer systems. Nevertheless, although these techniques have some success in stopping mass attacks (i.e., attacks that are not directed at a particular computer system), they are typically not adequate to prevent directed attacks by sophisticated attackers or attacks involving previously unknown vulnerabilities (e.g., vulnerabilities that have not yet been patched). Network firewalls, anti-virus software, and intruder detection systems, for example, attempt to discover malicious content in data packets sent to and from a computer system and to restrict network users to legitimate users and systems. Even so, however, these conventional techniques continue to allow packets without malicious content to be transmitted from a networked computer system with information that can be exploited by directed attackers using network fingerprinting. In addition, these conventional techniques do not typically determine the content that a communication application provides via its banners. Sensitive confidential data, as a result, continues to remain potentially exposed.

For these reasons, a need exists for additional techniques and apparatus for reducing the vulnerability of networked computer systems to directed attacks.

SUMMARY OF THE INVENTION

Embodiments of the present invention address the above-identified need by providing methods and apparatus for reducing the vulnerability of networked computer systems to directed attacks.

In accordance with an aspect of the invention, an attacker is prevented from obtaining information about the configuration of a computer system. Each of one or more revealing content elements that may be found in outgoing data transmitted by the computer system and that are capable of being used by the attacker to obtain the information about the configuration of the computer system is associated with one or more respective replacement content elements. Outgoing data to be transmitted by the computer system are then scanned for these one or more revealing content elements. A revealing content element found in the outgoing data is replaced by a replacement content element from the one or more replacement content elements associated with that revealing content element. This is done before the outgoing data is transmitted.

In accordance with one of the above-described embodiments of the invention, a networked computer system comprises a content hardening wrapper unit (CHWU). The CHWU contains a content database in which revealing content elements that may be used by a directed attacker to obtain configuration information about the computer system are associated with replacement content elements. When the computer system is going to transmit outgoing data, the outgoing data is first sent to the CHWU. The CHWU scans the outgoing data for the revealing content elements in the content database and, when they are found, replaces the revealing content elements with randomly chosen replacement content elements. The modified outgoing data is then transmitted. Any content in the outgoing data that may be useful for network fingerprinting or banner grabbing is thereby reduced.

These and other features and advantages of the present invention will become apparent from the following detailed description which is to be read in conjunction with the accompanying drawings.

BRIEF DESCRIPTION OF THE DRAWINGS

FIG. 5 shows a table in the content database of the FIG. 1 computer system.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

The term "computer system" as used herein is intended to be broadly construed and is meant to encompass any combination of hardware, firmware, and software that is operative to perform data processing functions. The components of a computer system may be collocated or distributed over a large geographic area. Moreover, a computer system may encompass a single system or a combination of interconnected systems. A computer system may comprise, for example, anything from a personal computer for use by an individual to a distributed enterprise system for use by a large organization.

Figure 1:
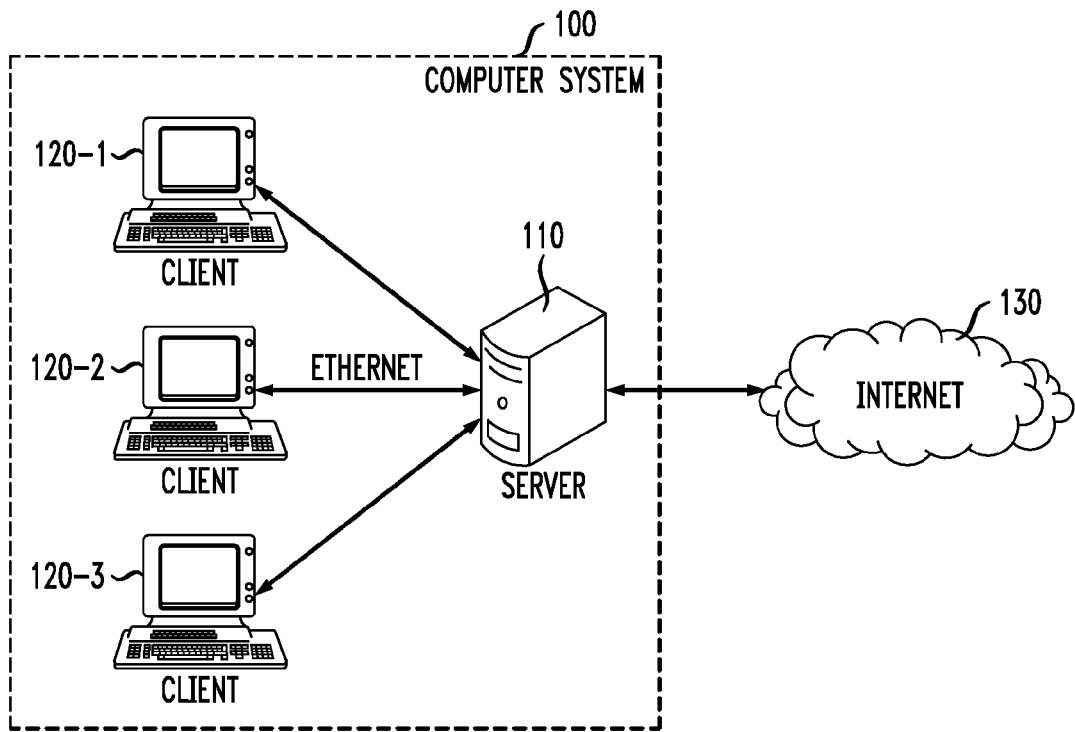
FIG. 1 shows a block diagram of a networked computer system in accordance with an illustrative embodiment of the invention.

FIG. 1 shows a block diagram of a computer system 100 in accordance with an illustrative embodiment of the invention. Such a computer system may, for example, be found in a small business. The computer system comprises a server 110 that services three client computers 120-1, 120-2, and 120-3. The client computers are connected to the server via a local area network such as an Ethernet network. The server provides the client computers with access to an external network, in this case the internet 130.

Figure 2:
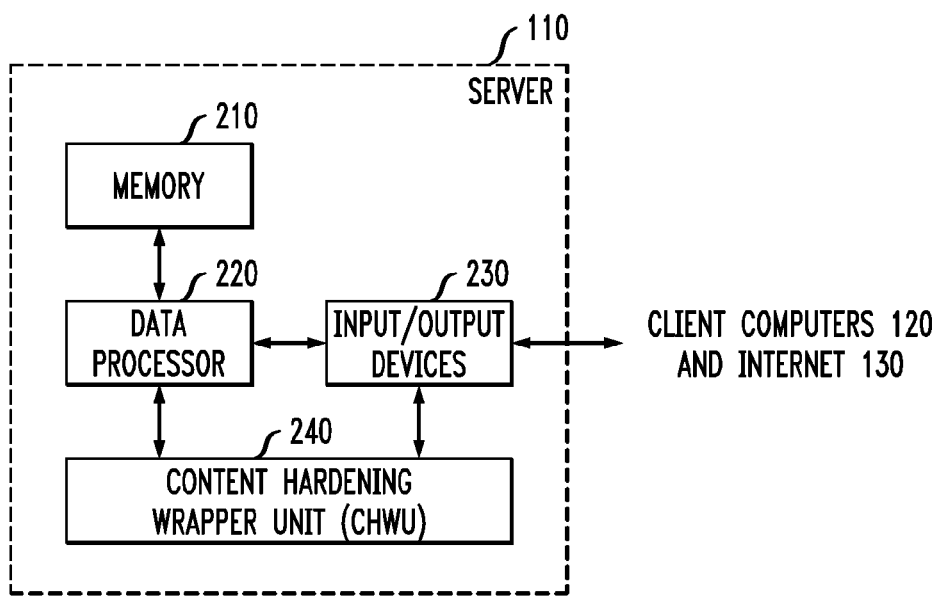
FIG. 2 shows a block diagram of the server in the FIG. 1 computer system.

Additional details of the server 110 are shown in the block diagram in FIG. 2. The server comprises a memory 210, a data processor 220, input and output (input/output) devices 230, and a CHWU 240. As is typical, the memory is operative to temporarily or permanently store data and software code for the server, while the data processor is operative perform data processing tasks. The input/output devices allow the server to interface with the client computers 120 as well as with other computer systems through the internet 130.

The memory 210 of the server 110 may include storage devices such as conventional hard disk drives and random access memories. The data processor 220, moreover, may comprise a number of different processors such as, but not limited to, the Xeon® processor from Intel Corp. of Santa Clara, Calif., USA; the Opteron® processor from Advanced Micro Devices, Inc of Sunnyvale, Calif., USA; and the PowerPC® processor from International Business Machines Corp. of Armonk, N.Y., USA. The input/output devices 230 may include one or more network interface cards and/or modems.

The server 110 may operate using a variety of operating systems. Presently, popular operating system for servers include, for example: Microsoft Windows® from Microsoft Corp. of Redmond, Wash., USA; Linux® (Open Source); Mac OS® from Apple Inc. of Cupertino, Calif., USA; Netware® from Novell, Inc. of Waltham, Mass., USA; and Solaris® from Sun Microsystems, Inc. of Santa Clara, Calif., USA. There are, however, many other server operating systems available and any particular choice may fall within the scope of this invention.

Figure 3:
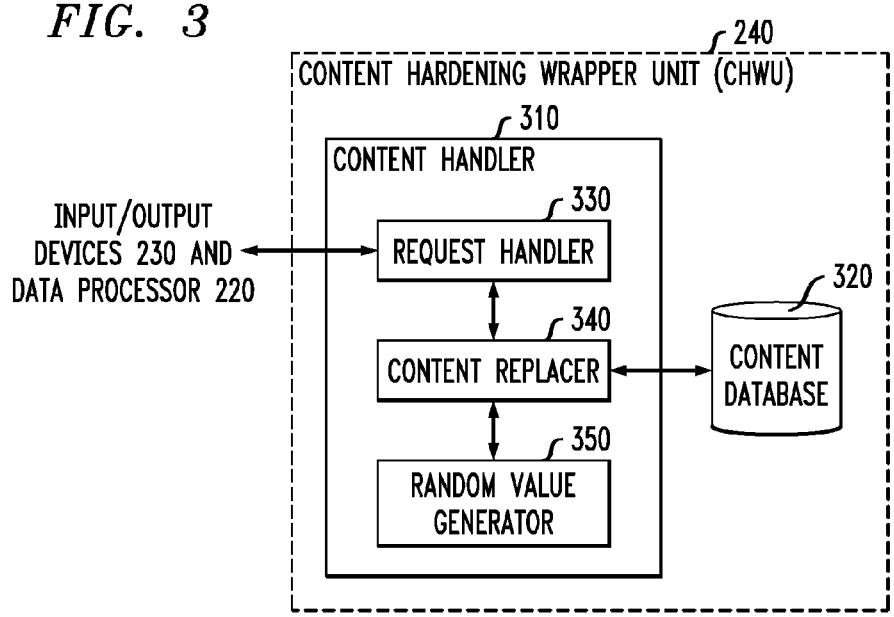
FIG. 3 shows a block diagram of the CHWU in the FIG. 1 computer system.

As one skilled in the art will recognize, the CHWU 240 is not an element in a conventional computer system. FIG. 3 shows a block diagram of an embodiment of this unit in the server 110. The CHWU comprises both a content handler 310 and a content database 320. The content handler, in turn, comprises a request handler 330, a content replacer 340, and a random value generator 350. The content handler preferably has its own data processing capabilities or, alternatively, has the ability to access the data processing capabilities of the data processor 220 (as indicated by the two-way arrow between these devices in FIG. 2).

Figure 4:
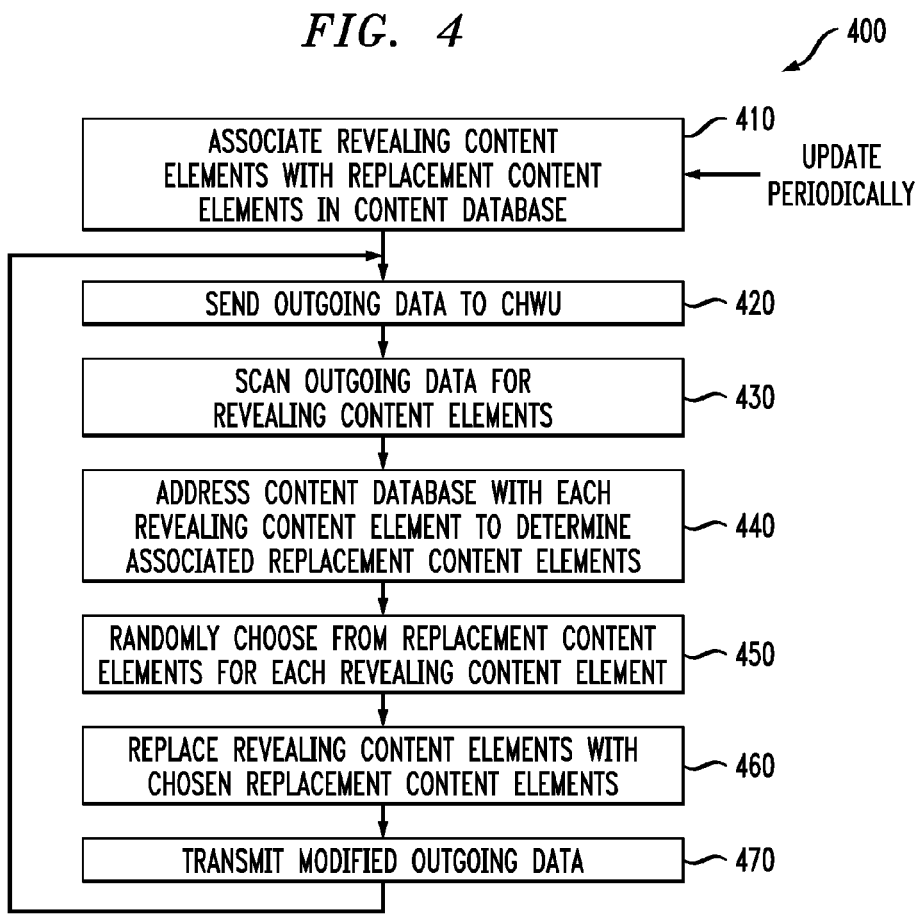
FIG. 4 shows a flow diagram of a method for reducing the vulnerability of the FIG. 1 computer system to directed attacks.

FIG. 4 shows a flow diagram of a method embodiment 400 for reducing the vulnerability of the computer system 100 to directed attacks. In particular, this illustrative method embodiment tries to thwart attempts by directed attackers to detect configuration information about the computer system using network fingerprinting and banner grabbing techniques. Any confidential information stored on the computer system is thereby made substantially more secure.

Step 410 of the method embodiment 400 comprises associating revealing content elements with replacement content elements in the content database 320. Revealing content elements comprise those elements within outgoing data transmitted by the computer system 100 that may be used by a directed attacker to determine configuration information about the computer system. For example, revealing content elements may be used to learn operating systems, software applications, equipment manufacturers, protocol header vendors, and other detailed system information. Replacement content elements, in contrast, comprise those elements that are going to replace the revealing content elements. The replacement of revealing content elements with replacement content elements obfuscates the actual configuration of computer system.

Revealing content elements in outgoing data from computer systems are generally known to those skilled in the art. For example, the following nine content elements found in the TCP/IP protocol header fields, alone or combination with other content elements, are generally recognized by those skilled in the art as revealing operating system information about a transmitting computer system:

1. Initial Time to Live;
2. Window Size;
3. Initial Sequence Number;
4. Maximum Segment Size;
5. Don't Fragment Flag;
6. Selective Acknowledgement OK Option;
7. No Operation Option;
8. Window Scaling Option; and
9. Initial Packet Size.

Therefore, some of these revealing content elements would preferably be associated with replacement content elements in the content database 320.

In the content database 320, each revealing content element is preferably associated with a respective set of replacement content elements, meaning that each revealing content element is associated with more than one replacement content element. FIG. 5 shows an example of several entries stored in the content database with the revealing content elements and the replacement content elements configured as a table 500. The revealing content elements constitute a first column in the table and the replacement content elements constitute a second column. Of course, the table 500 is merely illustrative. Such a table in actual application would be expected to be much more extensive than that shown herein.

It will be noted that several of the illustrative revealing content elements in the table 500 in FIG. 5 have a dependency on the content of the outgoing data as well as on conditions external to the content of the outgoing data. Such a latter dependency is hereinafter called an "external dependency." The ability to use external dependencies is advantageous because several content elements that regularly occur in outgoing data are only "revealing" when other conditions in the computer system are met. A content element may only be revealing when, for example, an incoming message that prompts a response message from the computer system is configured in a certain manner, contains certain content elements, or is sent to a particular port in the computer system. The content handler 310 is preferably able to determine the state of an external dependency (i.e., whether the external dependency exists or not) by querying elements within the remainder of the computer system 100.

Moreover, it will be further noted that some of the illustrative replacement content elements in the table 500 comprise formulas rather than fixed values. The replacement content elements may include, for example, a content element from incoming data that is manipulated in some manner. The content handler 310 can handle the calculations of the replacement content elements itself, or, alternatively, if the content handler is unable to make such calculations, query the data processor 220 for solutions to the formulas.

Programming of the content database 320 is preferably accomplished while the CHWU 240 is being initially configured. It may also be beneficial to periodically update the entries in the content database as new threats are discovered. Once step 410 is accomplished, the CHWU will be in condition for routine operation in the manner indicated by steps 420-470.

In step 420, the input/output devices 230 of the computer system 100 send outgoing data to be transmitted by the computer system to the request handler 330 of the CHWU 240. The request handler passes this data on to the content replacer 340, which, in step 430, scans the outgoing data for revealing content elements stored in the content database 320. When necessary, the content handler addresses elements within the remainder of the computer system during the scan to determine the states of any external dependencies. Then, in step 440, the content replacer addresses the content database 320 with each revealing content element found in the outgoing data. For each particular revealing content element discovered by the scanning, the content database returns the set of replacement content elements associated with that particular revealing content element.

Choosing among the set of replacement content elements for each of the revealing content elements found in the outgoing data is preferably done randomly. To do so, the content replacer 340 addresses the random value generator 350 in step 450 which acts to randomly select one of the returned replacement content elements for each revealing content element. In step 460, the content replacer then replaces the revealing content elements with the randomly selected replacement content elements. The content replacer then passes the modified outgoing data to the request handler 330 which, subsequently, returns the outgoing data to the input/output devices 230. The input/output devices then transmit the modified outgoing data in step 470.

Once steps 420-470 are completed, the CHWU 240 is then prepared to receive and modify another set of outgoing data by returning back to step 420.

To further illustrate the method embodiment 400, three examples of the operation of the computer system 100 will now be described.

1. Banner Grabbing

As described earlier, banners associated with communication applications implementing communication protocols such as TELNET, FTP, SMTP, Hypertext Transfer Protocol (HTTP), Post Office Protocol (POP), Structured Query Language Protocol (SQL), and Secure Shell Protocol (SSH) may reveal operating system and operating system version information about the configuration of a computer system. Nevertheless, as indicated in the table 500 in FIG. 5, when the content handler 310 scans outgoing data for revealing content elements, it looks for precisely this kind of operating system/version information in the outgoing data. When found, the content handler replaces any such revealing content elements with randomly chosen replacement content elements that provide false operating system/version information. A directed attacker, thereby, receives no useful information from the process of banner grabbing.

2. Network Fingerprinting by TCP Connection

As one skilled in the art will recognize, to establish a connection in TCP requires a four-way handshake procedure. More particularly, to initiate a connection, an initiating computer system sends a synchronization (SYN) packet (i.e., a packet with the SYN flag set) to a receiving computer system. This SYN packet includes a 32-bit Sequence Number, x, in the TCP protocol header fields. The receiving computer system records x from the initiating computer system, and replies with a SYN and acknowledgement (ACK) packet (i.e., a packet with the SYN and ACK flags set). This SYN-ACK packet includes a 32-bit Acknowledgement Number and another Sequence Number, y, in the TCP protocol header fields. The Acknowledgement Number contains the next sequence number that the receiving computer system is expecting to receive, namely, x+1. Finally, the initiating computer responds with an ACK packet. This packet includes an Acknowledgement Number set to y+1.

The connection termination phase typically uses a two-way handshake, with each side of the connection terminating independently. When an initiating or receiving computer system wishes to stop its half of the connection, it transmits a no-more-data (FIN) packet (i.e., a packet with the FIN flag set), which the other end acknowledges with an ACK packet.

One recognized method used by directed attackers to determine the configuration of a computer system involves the directed attacker sending a FIN packet to a closed port on the targeted computer system. Most operating systems respond with an ACK packet comprising a Sequence Number equal to that in the received FIN packet. However, certain operating systems, such as some Windows-based operating systems, send an ACK packet with a Sequence Number equal to the received Sequence Number plus one. This behavior may be used to identify the operating system on the targeted computer system.

The computer system 100 avoids these revealing content elements when such a directed attack is attempted. As can be seen from the table 500, when a directed attacker sends a FIN packet to a closed port, the computer system responds with an ACK packet comprising a randomly selected Sequence Number. Sometimes the Sequence Number in the ACK packet is equal to that in the FIN packet and sometimes it is equal to that in the FIN packet plus one. This random Sequence Number thereby avoids sending information to the directed attacker that can be utilized for network fingerprinting.

3. Network Fingerprinting by UDP Connection

When an initiating computer system sends a UDP packet to an unused port on a receiving computer system, the receiving computer system may respond with an Internet Control Message Protocol (ICMP) Port Unreachable Message. This message may include a Type of Service (TOS) field in the ICMP protocol header fields.

Unfortunately, the content of the TOS field may be used by directed attackers to determine configuration information about the receiving computer system. A directed attacker may purposefully send a UDP packet to a closed port on a targeted computer system and wait for the ICMP Port Unreachable Message. Most operating systems place a zero in the TOS field of such a message. Nevertheless, Linux-based operating systems tend to place a "0xC0" into the TOS field. The content of the TOS field therefore becomes a way to discover the operating system of the targeted computer system.

As indicated in FIG. 5, such directed attacks are thwarted in the computer system 100 by having the content handler 310 randomly place a zero or "0xC0" in the TOS field when returning a ICMP Port Unreachable Message after receiving a UDP message at an unused port. Again, in this manner, no useful configuration information is provided to the directed attacker.

It should be noted that, while the above-described elements of the server 110 and CHWU 240 are shown as discrete elements in the block diagrams in FIGS. 2 and 3, this representation is merely used to help delineate these elements from one another based on their respective functions. As a result, these block diagrams should not be construed as describing a physical configuration in actual hardware. The CHWU may be implemented in software, firmware, or hardware, or a combination of both. When implemented in software, the software may run on the data processor 220 in combination with the memory 210 in the server 110 or, alternatively, on an entirely different data processor and memory. Likewise, when implemented in hardware, the CHWU may be formed on the same integrated circuit as the data processor, or may instead be formed on an integrated circuit discrete from that of the data processor. Such a discrete integrated circuit may comprise, but is not limited to, an Application Specific Integrated Circuit (ASIC) or a Field Programmable Gate Array (FPGA). A hardware-based CHWU may in some cases be advantageous to a software-based implementation. Some hardware-based implementations may, for example, be less prone to discovery by directed attackers than software-based implementations.

When forming an integrated circuit, a plurality of identical die are typically formed in a repeated pattern on a surface of a semiconductor (e.g., silicon) wafer. Each die may include an element described herein, and may include other structures or circuits. The individual die are then cut or diced from the wafer and packaged as an integrated circuit. One skilled in the art would know how to process wafers, dice wafers, and package die to produce integrated circuits. Integrated circuits so manufactured are considered part of this invention.

In addition, because the CWHU 240 may be implemented in software, a processor-readable storage medium storing programs that, when executed by a computer system, cause the computer system to implement aspects of the invention would also fall within the scope of the invention.

It should also again be emphasized that, although illustrative embodiments of the present invention have been described herein with reference to the accompanying figures, the invention is not limited to these precise embodiments. For example, alternative embodiments may use different elements, computer systems, or method steps from those described herein. One skilled in the art will recognize the various changes and modifications that may be made without departing from the scope of the appended claims.

What is claimed is:

1. A method of preventing an attacker from obtaining information about the configuration of a computer system, the method comprising the steps of:

associating each of one or more revealing content elements that may be found in outgoing data transmitted by the computer system with one or more respective replacement content elements, each of the one or more revealing content elements capable of being used by the attacker to obtain the information about the configuration of the computer system;

scanning outgoing data to be transmitted by the computer system to determine whether at least one header within the outgoing data contains at least one of the one or more revealing content elements; and replacing a revealing content element found in the outgoing data with a replacement content element from the one or more replacement content elements associated with that revealing content element before the outgoing data is transmitted.

2. The method of claim 1, wherein the at least one header comprises a protocol header field of the outgoing data.

3. The method of claim 2, wherein the protocol header field comprises a Transmission Control Protocol protocol header field.

4. The method of claim 2, wherein the protocol header field comprises an Internet Protocol protocol header field.

5. The method of claim 1, wherein the at least one header comprises a response header associated with a communication application of the computer system.

6. The method of claim 5, wherein the communication application is operative to implement at least one of the Teletype Network Protocol, the File Transfer Protocol, the Simple Mail Transfer Protocol, the Hypertext Transfer Protocol, the Post Office Protocol, the Structured Query Language Protocol, and the Secure Shell Protocol.

7. The method of claim 1, wherein at least one of the one or more revealing content elements is capable of being used by the attacker to obtain information about an operating system of the computer system.

8. The method of claim 1, wherein the step of scanning the outgoing data for the one or more revealing content elements comprises determining at least one of a state of the computer system and a content of data received by the computer system.

9. A computer system adapted to prevent an attacker from obtaining information about the configuration of the computer system, the computer system comprising a processor operative to implement:

a content database, the content database being operative to associate each of one or more revealing content elements that may be found in outgoing data transmitted by the computer system with one or more respective replacement content elements, each of the one or more revealing content elements capable of being used by the attacker to obtain the information about the configuration of the computer system; and a content handler, the content handler being operative to scan outgoing data to be transmitted by the computer system to determine whether at least one header within the outgoing data contains at least one of the one or more revealing content elements, and to replace a revealing content element found in the outgoing data with a replacement content element from the one or more replacement content elements associated with that revealing content element before the outgoing data is transmitted.

10. The computer system of claim 9, wherein the content database comprises a table wherein at least a first column of the table comprises the one or more revealing content elements and wherein at least a second column of the table comprises the one or more replacement content elements.

11. The apparatus of claim 10, wherein at least one of the one or more revealing content elements in the first column of the table is associated with two or more replacement content elements in the second column of the table.

12. The apparatus of claim 10, wherein the operation of replacing a revealing content element found in the outgoing data with a replacement content element comprises selecting the replacement content element randomly from the one or more replacement content elements in the at least second column of the table which are associated with that revealing content element.

13. The computer system of claim 9, wherein the content handler is at least partially implemented in an Application Specific Integrated Circuit or Field Programmable Gate Array.

14. The computer system of claim 9, wherein at least one of the one or more revealing content elements is capable of being used by the attacker to obtain information about an operating system of the computer system.

15. The computer system of claim 9, wherein the content database is periodically updated.

16. The computer system of claim 9, wherein the at least one header comprises a protocol header field of the outgoing data.

17. The computer system of claim 9, wherein the at least one header comprises a response header associated with a communication application of the computer system.

18. An article of manufacture comprising a non-transitory processor-readable storage medium storing one or more programs, the one or more programs, when executed by the computer system, being operative to cause the computer system to perform at least the steps of claim 1.

19. An apparatus adapted to prevent an attacker from obtaining information about the configuration of a computer system coupled the apparatus comprising a processor operative to implement:

a content database, the content database being operative to associate each of one or more revealing content elements that may be found in outgoing data transmitted by the computer system with one or more respective replacement content elements, each of the one or more revealing content elements capable of being used by the attacker to obtain the information about the configuration of the computer system; and a content handler, the content handler being operative to scan outgoing data to be transmitted by the computer system to determine whether at least one header within the outgoing data contains at least one of the one or more revealing content elements, and to replace a revealing content element found in the outgoing data with a replacement content element from the one or more replacement content elements associated with that revealing content element before the outgoing data is transmitted.

20. The apparatus of claim 19, wherein the apparatus is at least partially implemented in an integrated circuit.

* * * * *